(12) United States Patent
Mecklenburg et al.

(10) Patent No.: US 7,879,931 B2
(45) Date of Patent: Feb. 1, 2011

(54) MOLDING COMPOSITIONS OF A GLASS FIBER-REINFORCED OLEFIN POLYMER

(75) Inventors: Thomas Mecklenburg, Butzbach (DE); Jürgen Rohrmann, Kelkheim (DE)

(73) Assignee: Basell Polyolefine GmbH, Wesseling (DE)

( * ) Notice: Subject to any disclaimer, the term of this patent is extended or adjusted under 35 U.S.C. 154(b) by 1012 days.

(21) Appl. No.: 10/576,457

(22) PCT Filed: Oct. 19, 2004

(86) PCT No.: PCT/EP2004/011798

§ 371 (c)(1),
(2), (4) Date: Apr. 20, 2006

(87) PCT Pub. No.: WO2005/040263

PCT Pub. Date: May 6, 2005

(65) Prior Publication Data

US 2007/0123615 A1    May 31, 2007

Related U.S. Application Data

(60) Provisional application No. 60/518,425, filed on Nov. 6, 2003, provisional application No. 60/573,132, filed on May 21, 2004.

(30) Foreign Application Priority Data

Oct. 21, 2003  (DE) ............................... 103 49 480
Apr. 16, 2004  (DE) ...................... 10 2004 019 180

(51) Int. Cl.
*C08K 5/34*  (2006.01)
*C08K 3/40*  (2006.01)

(52) U.S. Cl. ...................................... 524/88; 524/494

(58) Field of Classification Search ................. 524/88, 524/494
See application file for complete search history.

(56) References Cited

U.S. PATENT DOCUMENTS 5,056,426 A * 10/1991 Warych ...................... 100/26
5,931,997 A *  8/1999 Babler ........................ 106/410

FOREIGN PATENT DOCUMENTS

| EP | 663418 | 3/1999 |
|---|---|---|
| EP | 663418 B1 * | 3/1999 |
| WO | 00/48957 | 8/2000 |

OTHER PUBLICATIONS

Iroh, Jude O. & Berry, J.P. "Heterogeneous nucleation of short glass fibre-polypropylene composites." *Polymer*, vol. 34, No. 22. pp. 4747-4751. (1993).
Iroh, Jude O. & Berry J.P. "Mechanical properties of nucleated polypropylene and short glass fiber-polypropylene composites." *European Polymer Journal* vol. 32 No. 12. pp. 1425-1429, (1996).

* cited by examiner

*Primary Examiner*—Robert D. Harlan
(74) *Attorney, Agent, or Firm*—William R. Reid

(57) ABSTRACT

The invention relates to a glass fiber-reinforced molding composition composed of an olefin polymer, in particular a propylene polymer. The molding composition comprises an olefin polymer which contains 5-50% by weight of glass fibers which are bonded to the olefin polymer by means of a compatibilizer, and from $10^{-4}$ to 1% by weight, preferably from $10^{-3}$ to $10^{-1}$% by weight, of a phthalocyanine pigment as the nucleating agent. The low costs and the fact that even a very small fraction of the phthalocyanine pigment in the polymer leads to sufficient nucleation ensures extremely inexpensive production. The nucleation with the phthalocyanine pigment leads to an improvement in the impact strength, and also in the yield stress and tensile strain at break of the molding composition.

14 Claims, 3 Drawing Sheets

MOLDING COMPOSITIONS OF A GLASS FIBER-REINFORCED OLEFIN POLYMER

This application is the U.S. national phase of International Application PCT/EP2004/011798, filed Oct. 19, 2004, claiming priority to German Patent Application 10349480.4 filed Oct. 21, 2003 and German Patent Application 102004019180.8 filed Apr. 16, 2004, and the benefit under 35 U.S.C. 119(e) of U.S. Provisional Application No. 60/518,425, filed Nov. 6, 2003 and U.S. Provisional Application No. 60/573,132 filed May 21, 2004; the disclosures of International Application PCT/EP2004/011798, German Patent Applications 10349480.4 and 102004019180.8 and U.S. Provisional Application Nos. 60/518,425 and 60/573,132, each as filed, are incorporated herein by reference.

The invention relates to a molding composition composed of an olefin polymer, in particular a propylene polymer, containing 5-50% by weight glass fibers which are bonded to the olefin polymer by means of a compatibilizer, and from $10^{-4}$ to 1% by weight of a phthalocyanine pigment as the nucleating agent.

The reinforcement of olefin polymers with the aid of glass fibers has been known for some time. EP 663 418 A1 describes, for example, a polypropylene molding composition which is reinforced with glass fibers. However, to obtain good mechanical properties, it is necessary to use compatibilizers or coupling agents which ensure good binding of the glass fibers to the polyolefin matrix. The compatibilizers frequently comprise firstly a reactively modified polymer which is compatible with the matrix polymer as a coupler, and secondly a compound having reactive polar groups which can bond both to the glass fibers and to the coupler.

It is likewise generally customary to nucleate unreinforced polymers of propylene to improve the stiffness and strength, but also the transparency, of the molding produced therefrom. To this end, in addition to sodium benzoate, fine talc, phosphate ester salts, sorbitols, quinacridone pigments and others, phthalocyanine pigments are also used as nucleating agents. The nucleation generally leads to an improvement in the tensile strength and stiffness, but not to a significant improvement in the impact strengths, and often to a reduced yield elongation and tensile strain at break.

In Polymer 34, 4747 (1993) and in European Polymer Journal 32, 1425 (1996), the influence of nucleation on polypropylene-glass fiber composites using sodium benzoate as a nucleating agent was investigated. For the nucleated glass fiber composites, a modulus of elasticity increased by 10% and tensile strength increased by 10% compared to the non-nucleated composites was found.

The sodium benzoate, and also many other nucleating agents, as a consequence of their polar character which improves the nucleation, have the disadvantage that they can react with the coupler of the compatibilizer and thus interfere with the binding of the glass fibers, or, as a consequence of their high cost, are of little economic attractiveness.

A particular disadvantage of nucleating agents such as sodium benzoate is the only moderate hot water resistance and vapor resistance of the polyolefin molding compositions, especially in the case of long-term contact over several weeks or months.

Figure 1:
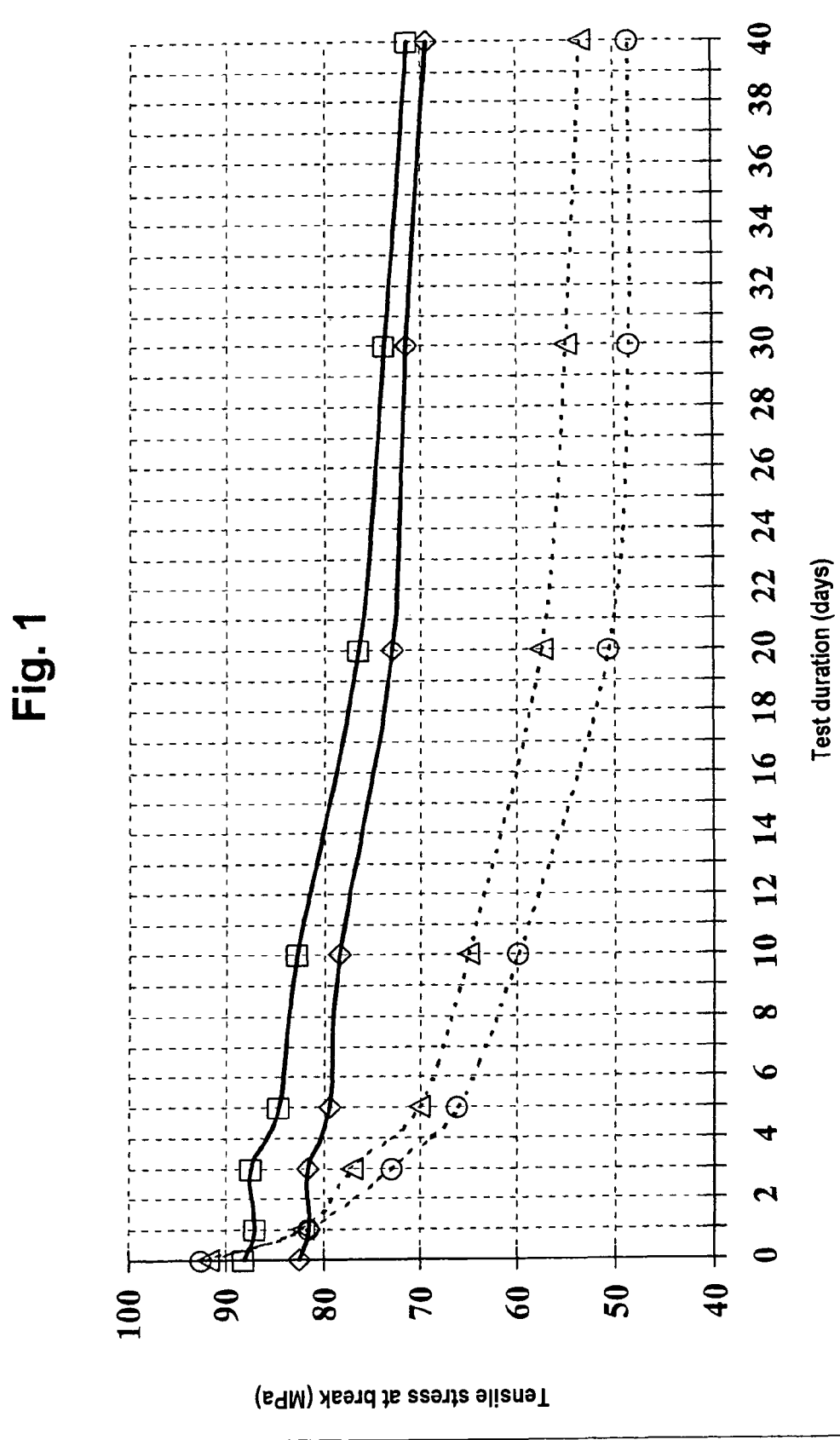
FIG. 1 illustrates Tensile stress at break as a function of duration of hot water contact for polymer samples.

It is an object of the present invention to provide a polyolefin molding composition which exhibits improved matrix binding of the glass fibers and therefore better mechanical properties and is obtainable inexpensively and has improved resistance to hot water, especially in the presence of detergents.

We have found that this object is achieved, surprisingly, by the combination of glass fibers which are bonded to the olefin polymer by means of a compatibilizer, and a phthalocyanine pigment, which allows particularly good matrix binding of the glass fibers in the matrix polymer, in particular propylene polymer, to be achieved. Accordingly, the molding compositions according to the invention comprise an olefin polymer containing 5-50% by weight of glass fibers and from $10^{-4}$ to 1% by weight, preferably from $10^{-3}$ to $10^{-1}$% by weight, of a phthalocyanine pigment as a nucleating agent. The low costs of the phthalocyanine pigment and the fact that even a very small fraction of the phthalocyanine pigment in the polymer leads to sufficient nucleation ensures extremely inexpensive production. In addition, the polyolefin molding composition features excellent hot water resistance.

Essential for the polyolefin molding composition according to the invention is firstly the content of from 5 to 50% by weight of glass fibers based on the overall composition. The glass fibers may be either cut glass fibers having a length of from 3 to 6 mm or long glass fibers, although preference is given to using cut glass fibers. Preference is further given to using from 10 to 40% by weight, more preferably from 20 to 40% by weight, of glass fibers.

Preference is given to using cut glass fibers, also known as chopped strands. When cut glass fibers are used, it is possible to attain by nucleation the stiffness of molding compositions comprising long glass fibers at a distinctly more favorable price. The glass fibers used preferably have a length of from 3 to 6 mm, more preferably from 3 to 4.5 mm, and a diameter of from 10 to 20 μm, preferably from 12 to 14 μm. Depending on the compounding and injection molding conditions, the length of the glass fibers in the molding composition (granules or injection-molded finished particles) is from 50 μm to 3 000 μm, preferably from 50 to 1 000 μm.

To bind glass fibers to the polyolefin matrix, a polar-functionalized compatibilizer is used. One type which can be used is low molecular weight compounds which serve exclusively to make the glass fibers less hydrophilic and therefore more compatible with the polymer. Suitable compounds are, for example, silanes such as aminosilanes, epoxysilanes, amidosilanes or acrylosilanes. However, the compatibilizers preferably comprise a functionalized polymer and a low molecular weight compound having reactive polar groups. The functionalized polymer is preferably graft or block copolymers which are compatible with the matrix polymer. For a propylene homopolymer as the matrix component, preference is given, for example, to using a graft or block copolymer of propylene as the functionalized polymer.

In this context, preference is given to those polymers whose reactive groups are acid anhydrides, carboxylic acids, carboxylic acid derivatives, primary and secondary amines, hydroxyl compounds, oxazolines and epoxides, and also ionic compounds. Particular preference is given to using a propylene polymer grafted with maleic anhydride as the functionalized polymer. The low molecular weight compound serves to couple the glass fiber to the functionalized polymer and thus to bind it securely to the polyolefin matrix. These are usually bifunctional compounds, in which case one functional group can enter into a binding interaction with the glass fibers and the second functional group can enter into a binding interaction with the functionalized polymer. The low molecular weight compound used is preferably an amino- or epoxysilane, more preferably an aminosilane. The aminosilanes bond with the silane hydroxyl groups to the glass fiber, while the amino groups form a stable amide bond, for example with polypropylene grafted with maleic anhydride.

The compatibilizers can be used preprepared or prepared in situ. It is particularly advantageous to apply the low molecular weight component to the glass fibers before it is incorporated into the polyolefin matrix. The functionalized polymer can be generated in situ in a simple manner by reactive extrusion of the matrix polymer, for example with maleic anhydride. It is also possible to use a masterbatch which comprises the glass fibers and the compatibilizer in premixed form.

It is also essential to the present invention that the glass fiber-reinforced polypropylene molding composition is nucleated with a phthalocyanine pigment. The phthalocyanine pigments themselves are well known and are derived from the basic phthalocyanine structure by incorporating a central metal ion and by substituting the phthalocyanine ring. In practice, the central atoms used in the pigments are copper, nickel and cobalt, and copper is the preferred central atom. The basic phthalocyanine structure may optionally be substituted, in particular with chlorine or bromine atoms. Substitution with organic radicals can also be carried out to adapt the nucleation properties. Suitable phthalocyanine pigments are, for example, unsubstituted copper-phthalocyanine (phthalocyanine blue), polychlorinated copper-phthalocyanine (phthalocyanine green, $C_{32}H_2N_8Cl_{14}Cu$), cobalt-phthalocyanine ($C_{32}H_{16}N_8Co$), nickel-phthalocyanine ($C_{32}H_{16}N_8Ni$). Particular preference is given to unsubstituted copper-phthalocyanine.

Unsubstituted copper-phthalocyanine and polychlorinated copper-phthalocyanine are sold, for example, by Clariant, Frankfurt, DE under the names PV Echtblau and PV Echtgrün respectively.

The proportion of nucleating agent is between $10^{-4}$ and 1% by weight, based on the overall composition. Preference is given to using from $10^{-3}$ to $10^{-1}$% by weight, particular preference to from $5 \cdot 10^{-3}$ to $5 \cdot 10^{-2}$% by weight, of the nucleating agent.

The combination of glass fiber reinforcement and nucleation with phthalocyanine pigments results in a molding composition which is improved over the prior art with regard to the stiffness and toughness. In addition, the adhesion of the glass fibers to the polymer matrix is surprisingly distinctly improved with the same compatibilizer, which results in an improvement in the propagation of cracks in the molding composition. In addition, the nucleation with phthalocyanine pigments surprisingly results in distinctly improved long-term stabilities in the tensile strengths and impact strengths in hot water and hot detergents, for example over testing times of 1000 hours at 95° C., compared to nonnucleated glass fiber-reinforced comparative specimens. Advantages in the long-term stability of the inventive molding compositions can also be recognized, for example, in the long-term tests in aqueous detergents in accordance with the UL standards 2157 and 749, testing over 138 days at 82° C.

The particular advantage of the phthalocyanine pigment is that it is substantially compatible with the customary compatibilizers, i.e. there is no or hardly any mutual interference between the action of nucleating agent and compatibilizer.

The molding compositions according to the invention are obtainable by melting and mixing the olefin polymer with the phthalocyanine pigments and the glass fibers, and the mixing is effected in a mixing apparatus at temperatures of from 180 to 320° C. preferably from 200 to 280° C. more preferably from 220 to 260° C. Useful mixing apparatus in this context is in particular extruders or kneaders, and particular preference is given to twin-screw extruders. In the case of polymers present in powder form, it is appropriate to premix the polymer with the nucleating agent, and also any other additives, at room temperature in a mixing apparatus. The olefin polymer may be mixed with the nucleating agent and the glass fibers in one step or else in a plurality of steps. Preference is given to initially melting the olefin polymer with the nucleating agent and further additives in the mixing apparatus, and to mixing them, and subsequently mixing the glass fibers with the melt, in order to reduce the abrasion in the mixing apparatus and the fiber breakage.

Useful matrix components of the molding composition according to the invention are homopolymers and copolymers of alpha-olefins having from 2 to 12 carbon atoms, for example of ethylene, propene, 1-butene, 1-hexene or 1-octene. Also suitable are copolymers and terpolymers which, in addition to these monomers, contain further monomers, in particular dienes, for example ethylidenenorbornene, cyclopentadiene or butadiene.

Preferred matrix components are polyethylene, polypropylene, polybutylene and/or copolymers of ethene with propene, 1-butene, 1-hexene or 1-octene. In principle, any commercially available type thereof can be used. Useful types include, for example: linear polyethylene of high, moderate or low density, LDPE, ethylene copolymers having small amounts (up to a maximum of approx. 40% by weight) of comonomers such as propene, 1-butene, 1-hexene, 1-octene, n-butyl acrylate, methyl methacrylate, maleic anhydride, styrene, vinyl alcohol, acrylic acid, glycidyl methacrylate, and the like, isotactic or atactic homopolypropylene, random copolymers of propene with ethene and/or 1-butene, ethylene-propylene block copolymers and the like. Such polyolefins may also contain an impact strength component, for example EPM or EPDM rubber, or SEBS.

When polyethylene is used as the matrix component, the comonomer content of the ethylene copolymer should not exceed 1 mol % of the total amount of monomers used. Preferred comonomers are 1-olefins, and particularly preferred comonomers are 1-butene, 4-methyl-1-pentene, 1-hexene and 1-octene. The polyethylene may also be a blend of two or more polyethylene components.

Particular preference is given to using a propylene polymer as the matrix component. The propylene polymer used may in particular be a propylene homopolymer or else a propylene copolymer having up to 30% by weight of other olefins having up to 10 carbon atoms in copolymerized form. Such other olefins are in particular $C_2$-$C_{10}$-1-alkenes such as ethylene, 1-butene, 1-pentene, 1-hexene, 1-heptene or 1-octene, and preference is given to using ethylene, 1-butene or ethylene and 1-butene. Particular preference is given to using propylene homopolymers.

In this context, the copolymers of propylene are block or impact copolymers or preferably random copolymers. When the copolymers of propylene have a random structure, they generally contain up to 15% by weight, preferably up to 6% by weight, more preferably up to 2% by weight, of other olefins having up to 10 carbon atoms, in particular ethylene, 1-butene or a mixture of ethylene and 1-butene, as comonomers. The block or impact copolymers of propylene are polymers in which, in the first stage, a propylene homopolymer or a random copolymer of propylene having up to 15% by weight, preferably up to 6% by weight, more preferably up to 2% by weight, of other olefins having up to 10 carbon atoms as comonomers is prepared and then, in the second stage, a propylene-ethylene copolymer having ethylene contents of from 15 to 99% by weight, the propylene-ethylene copolymer additionally being able to contain further $C_4$-$C_{10}$-olefins, is polymerized thereto. In general, sufficient propylene-ethylene copolymer is polymerized thereto that the copolymer generated in the second stage has a content in the end product of from 3 to 90% by weight. The random copolymers of propylene are polymers in which, in the first stage, a propylene homopolymer or a random copolymer of propylene having up to 15% by weight, preferably up to 6% by weight, more preferably up to 2% by weight, of other olefins having up to 10 carbon atoms as comonomers is prepared and then, in the second stage, a propylene homopolymer or a random copolymer of propylene having up to 15% by weight, preferably up to 6% by weight (more preferably up to 2% of comonomers) of other olefins having up to 10 carbon atoms is polymerized thereto. The polymers of the two stages differ in the molar mass and the comonomer content. The ethylene content of the blend is 15% by weight or preferably up to 6% by weight and more preferably up to 3% by weight, of comonomers.

Preference is given to using isotactic polypropylene having a xylene-insoluble fraction of over 95%, preferably of over 97%. The polyolefin generally has an MFR (230° C./2.16 kg) of from 0.2 to 200 g/10 min to ISO 1133, preferably between 0.5 and 100 g/10 min and more preferably between 2 and 30 g/10 min. Preference is further given to polypropylene molding compositions having a monomodal molar mass distribution.

The molding compositions according to the invention may also comprise customary additives and auxiliaries, for example stabilizers against damaging processing effects, antioxidants against heat oxidation and aging, UV action, neutralizing agents, fillers, organic and inorganic pigments or pigment preparations, for example carbon black dispersions in polyolefins, antistats, nonpolar waxes or specific low molecular weight glidants and lubricants. UV stabilizers, especially monomeric and oligomeric HALS, antistats and polar waxes and also stearates are less suitable for the inventive molding compositions, or, if at all, in very low concentrations, since they may likewise react with the coupler of the compatibilizer and thus reduce the efficiency of the coupling. However, the amount of additives and auxiliaries should not exceed 10% by weight based on the total amount of the material, preferably 5% by weight. For visual reasons, it may also be advisable to add appropriate suitable color pigments to the molding compositions according to the invention and color them to another, preferably darker color.

The olefin polymers used in the molding compositions according to the invention can be obtained with all common processes and catalysts. Preference is given to polymerizing the appropriate monomers by means of a Ziegler-Natta catalyst, of a Phillips catalyst based on chromium oxide or of a metallocene catalyst. In this context, metallocenes are complexes of metals of groups 3 to 12 of the Periodic Table with organic ligands which, together with metallocenium ion-forming compounds, result in effective catalyst systems.

To prepare the olefin polymers, the customary reactors used for the polymerization of $C_2$-$C_{10}$-olefins can be used. Suitable reactors include continuous horizontal or vertical stirred tanks, circulation reactors, loop reactors, stage reactors or fluidized bed reactors. The size of the reactors is of no great importance for the preparation of the molding compositions according to the invention. It depends on the output which is to be achieved in the individual reaction zone or zones. The polymerization process can be carried out in one or more stages. The polymerization can be effected in the gas phase, in bulk or suspension or a combination thereof.

The molding composition according to the invention is suitable in particular for the production of motor vehicle parts which place high demands on the stiffness and toughness of the material. It is particularly advantageous to use it in motor vehicle parts which are dark-colored or provided with a decorative layer, for example front ends or dashboard supports, in which the blue coloration caused by the phthalocyanine pigment is covered. Moldings produced from the molding composition according to the invention are suitable, as a result of their improved stiffness and toughness even when cut glass fibers are used, for applications which have hitherto been reserved for long fiber-reinforced propylene polymers.

The molding composition according to the invention also features very good durability toward hot water and detergents. They can therefore be used particularly advantageously as the material for moldings which are exposed to contact with hot water, wash and rinse liquors and other aggressive materials. The present invention therefore further provides the use of the molding composition according to the invention as a wash liquor vessel (preferably not visible) in washing machines, and also wash liquor vessels produced from the molding composition according to the invention, but also the use for water and liquor pump casings.

EXAMPLE 1 a) Preparation of the Glass Fiber-Reinforced Polypropylene Molding Composition

The following proportions by weight are based in each case on the total mass of the polymer molding composition, unless stated otherwise.

69.19% by weight of polypropylene homopolymer (Moplen HP500H, Basell Polyolefine, Germany, MFR (230° C., 2.18 kg)=1.2 g/10 min) was admixed in a twin-screw extruder (ZSK 53) with 30% by weight of a short glass fiber (ECS 03T-T480 chopped strands, NEG) having a length of 3 mm and a diameter of 13 µm. This was done by metering the short glass fibers into the polymer molding composition melt at element 3 or 4 of the 10-section twin-screw extruder. 0.01% by weight of phthalocyanine blue 15:3 (PV-Echtblau 2GL SP, Clariant) as a nucleating agent, 1.2% by weight of Polybond 3200 (from Crompton) as a compatibilizer, 0.1% by weight of an inorganic acid scavenger and 0.5% by weight of a stabilizer combination composed of a phenolic antioxidant, distearyl thiodipropionate and a di-tert-butylphenyl phosphite were simultaneously also added to the polypropylene homopolymer.

b) Hot Water Test

The polypropylene molding composition from example 1 was processed in an injection molding machine to give specimens in accordance with DIN EN ISO 527-2 and DIN EN ISO 179/1.

The tensile stress at break and the tensile modulus of elasticity of the samples were determined to ISO 527-01 and -1. In addition, the Charpy impact strength was measured in accordance with DIN EN ISO 179/1eU.

The specimens were introduced into demineralized water at a temperature of 95° C. in a heatable bath. Depending on the application and requirements, different detergents may also be added with defined concentrations.

After the appropriate time, in each case at least 5 specimens were taken and the tensile stress at break and the tensile modulus of elasticity to DIN EN ISO 527-2 determined as the average of 5-10 individual measurements. In the same way, the Charpy impact strength was determined to DIN EN ISO 179/1eU.

Figure 2:
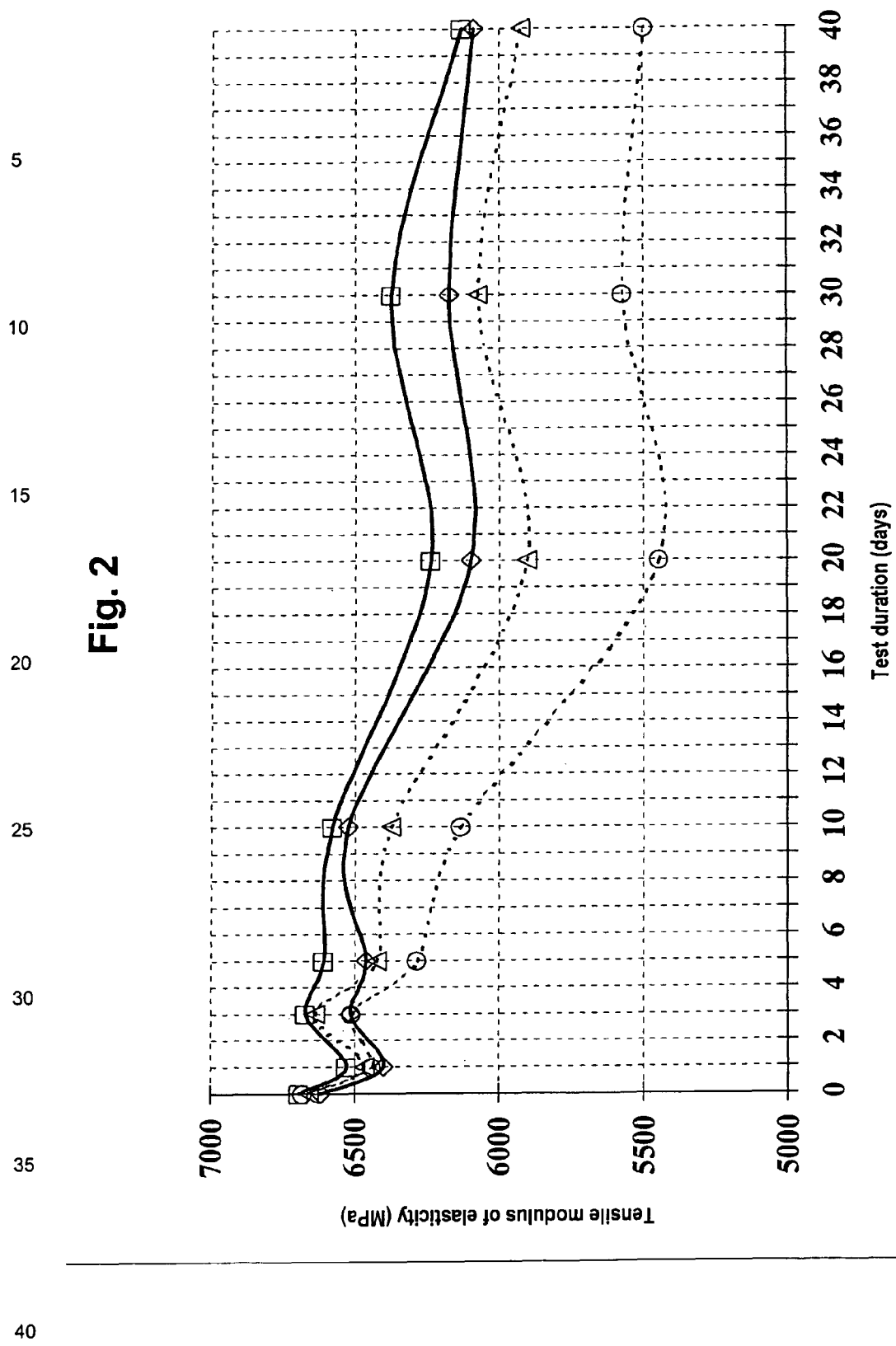
FIG. 2 illustrates Tensile modulus of elasticity as a function of duration of hot water contact for polymer samples.
Figure 3:
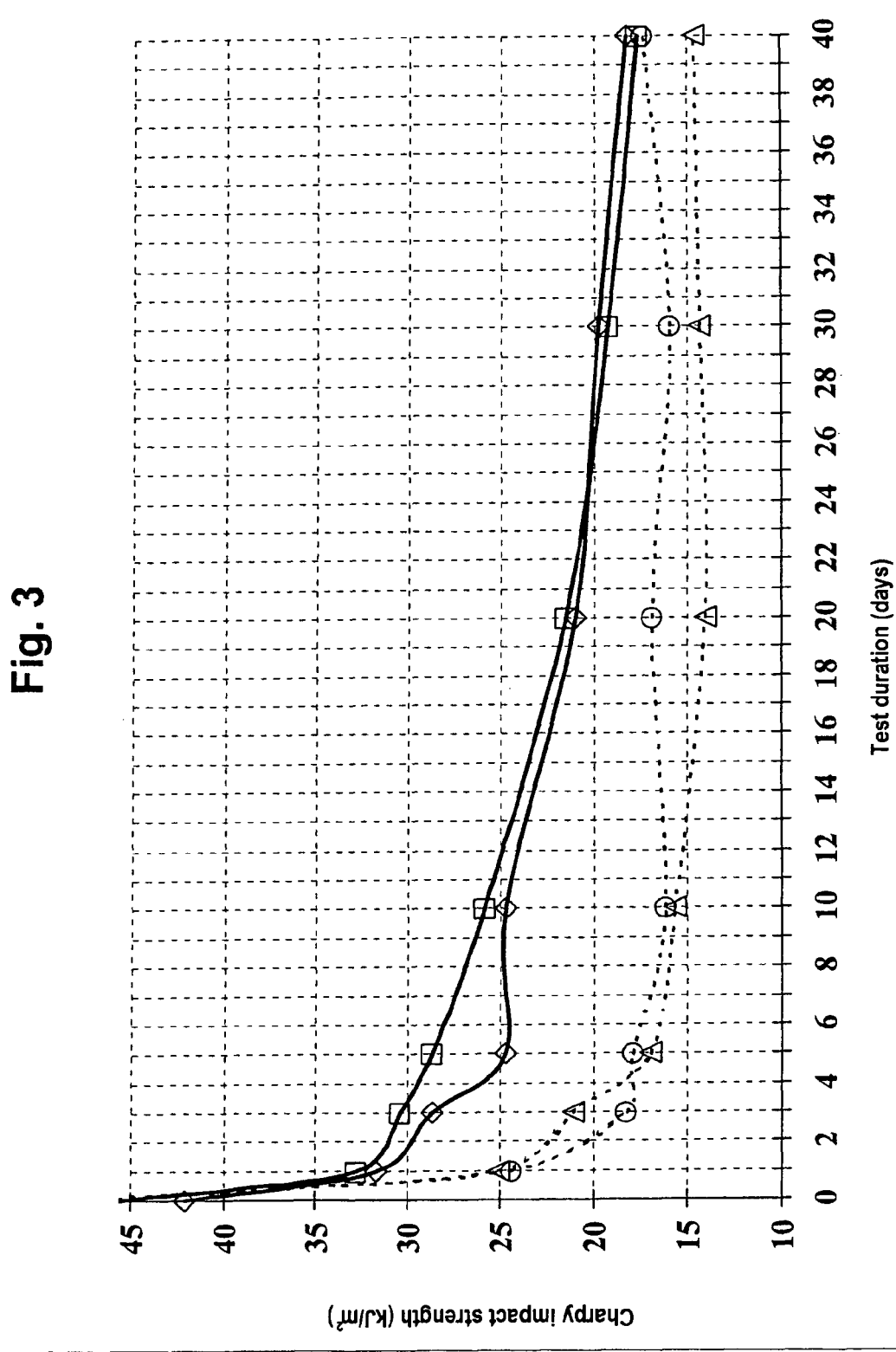
FIG. 3 illustrates Charpy impact strength as a function of duration of hot water contact for polymer samples.

The test results are compiled in tables 1 to 3 and in FIGS. 1 to 3.

EXAMPLE 2

Example 1 was repeated with a content of 0.05% by weight of phthalocyanine blue 15:3 (PV-Echtbau 2GL SP, Clariant). The amount of polypropylene was adjusted for a combined total mass of the polymer molding composition of 100% by weight.

COMPARATIVE EXAMPLE 3

Example 1 was repeated with a content of 0.1% by weight of sodium benzoate as a nucleating agent. The amount of polypropylene was adjusted for a combined total mass of the polymer molding composition of 100% by weight.

COMPARATIVE EXAMPLE 4

Example 1 was repeated with a content of 0.3% by weight of sodium benzoate as a nucleating agent. The amount of polypropylene was adjusted for a combined total mass of the polymer molding composition of 100% by weight.

TABLE 1

Tensile stress at break as a function of the duration of the hot water contact

| Test duration [days] | Tensile stress at break [MPa] | | | |
|---|---|---|---|---|
| | Example 1 [✧] | Example 2 [□] | Comparative example 3 [∇] | Comparative example 4 [○] |
| 0 | 82.6 | 88.2 | 91.9 | 92.5 |
| 1 | 81.5 | 87.0 | 82.1 | 81.5 |
| 3 | 81.7 | 87.4 | 77.2 | 72.9 |
| 5 | 79.4 | 84.7 | 70.2 | 66.2 |
| 10 | 78.5 | 82.8 | 65.1 | 59.8 |
| 20 | 73 | 76.5 | 57.4 | 50.6 |
| 30 | 71.5 | 73.8 | 55.0 | 48.4 |
| 40 | 69.4 | 71.4 | 53.4 | 48.4 |

TABLE 2

Tensile modulus of elasticity as a function of the duration of the hot water contact

| Test duration [days] | Tensile modulus of elasticity [MPa] | | | |
|---|---|---|---|---|
| | Example 1 [✧] | Example 2 [□] | Comparative example 3 [∇] | Comparative example 4 [○] |
| 0 | 6615 | 6692 | 6659 | 6679 |
| 1 | 6400 | 6530 | 6467 | 6440 |
| 3 | 6518 | 6670 | 6636 | 6514 |
| 5 | 6463 | 6607 | 6424 | 6284 |
| 10 | 6523 | 6579 | 6373 | 6134 |
| 20 | 6102 | 6239 | 5903 | 5445 |
| 30 | 6174 | 6373 | 6077 | 5570 |
| 40 | 6091 | 6134 | 5923 | 5496 |

TABLE 3

Charpy impact strength as a function of the duration of the hot water contact

| Test duration [days] | Charpy impact strength [kJ/m2] | | | |
|---|---|---|---|---|
| | Example 1 [✧] | Example 2 [□] | Comparative example 3 [∇] | Comparative example 4 [○] |
| 0 | 42.1 | 45.7 | 49.0 | 48.1 |
| 1 | 31.7 | 32.8 | 25.0 | 24.4 |
| 3 | 28.7 | 30.4 | 21.1 | 18.3 |
| 5 | 24.7 | 28.7 | 17.0 | 17.9 |
| 10 | 24.7 | 25.9 | 15.7 | 16.2 |
| 20 | 21.0 | 21.5 | 14.1 | 16.9 |
| 30 | 19.8 | 19.3 | 14.4 | 16.0 |
| 40 | 18.3 | 17.7 | 14.7 | 17.4 |

It can be seen that the fall in tensile stress at break and in the tensile modulus of elasticity and in the Charpy impact strength is surprisingly lower in the case of the glass fiber-reinforced propylene molding compositions nucleated with phthalocyanine (symbols ◊ and □) than in the of those nucleated with sodium benzoate (symbols ∇ and ○).

We claim:

1. A molding composition composed of an olefin polymer containing
    a) from 5 to 50% by weight of glass fibers which are bonded to the olefin polymer by means of a compatibilizer, and
    b) from $5 \times 10^{-3}$ to $5 \times 10^{-2}$% by weight of a phthalocyanine pigment as a nucleating agent.

2. The molding composition as claimed in claim 1, wherein the olefin polymer is a propylene polymer.

3. The molding composition as claimed in claim 1, wherein the glass fibers are cut glass fibers.

4. The molding composition as claimed in claim 1 containing from 10 to 40% by weight of glass fibers.

5. The molding composition as claimed in claim 1, wherein the compatibilizer comprises an olefin polymer functionalized with polar groups.

6. The molding composition as claimed in claim 5, wherein the functionalized compatibilizer comprises an olefin polymer grafted with maleic anhydride and an aminosilane or epoxysilane.

7. The molding composition as claimed in claim 2, wherein the propylene polymer is a propylene homopolymer.

8. The molding composition as claimed in claim 1, wherein the olefin polymer has a melt-mass flow rate to ISO 1133 at 230° C. and 2.16 kg of between 0.5 and 100 g/10 min.

9. A process for producing a molding composition comprising
    a) from 5 to 50% by weight of glass fibers which are bonded to a propylene polymer by means of a compatibilizer, and
    b) from $5 \times 10^{-3}$ to $5 \times 10^{-2}$% by weight of a phthalocyanine pigment as a nucleating agent,
    the process comprising initially melting the propylene polymer in a mixing apparatus; mixing the melted propylene polymer with the nucleating agent at a temperature of from 180 to 320° C., thereby forming a melt; and mixing the glass fibers with the melt.

10. An article produced from a molding composition comprising:
 a) from 5 to 50% by weight of glass fibers which are bonded to a propylene polymer by means of a compatibilizer, and
 b) from $5\times10^{-3}$ to $5\times10^{-2}$% by weight of a phthalocyanine pigment as a nucleating agent, the article being selected from the group consisting of a wash liquor vessel, water pump casing, and motor vehicle part.

11. The article of claim 10 wherein the motor vehicle part is a covering part.

12. The molding composition of claim 4 containing from 20 to 40% by weight of glass fibers.

13. The composition of claim 8 wherein the melt-mass flow rate is between 2 and 30 g/10 min.

14. The composition as claimed in claim 3 wherein the glass fibers have a length from 3 to 6 mm and a diameter from 10 to 20 μm.

* * * * *